United States Patent [19]

Shintani

[11] Patent Number: 5,218,181

[45] Date of Patent: Jun. 8, 1993

[54] PREVENTING SLAG DEPOSITS ON SURFACE TO BE PIERED BY PLASMA CUTTER

[75] Inventor: Toshiya Shintani, Kanagawa, Japan

[73] Assignee: Kabushiki Kaisha Komatsu Seisakusho, Tokyo, Japan

[21] Appl. No.: 743,421

[22] PCT Filed: Feb. 2, 1990

[86] PCT No.: PCT/JP90/00134

§ 371 Date: Aug. 22, 1991

§ 102(e) Date: Aug. 22, 1991

[87] PCT Pub. No.: WO90/09860

PCT Pub. Date: Sep. 7, 1990

[30] Foreign Application Priority Data

Feb. 23, 1989 [JP] Japan ................................. 1-44095

[51] Int. Cl.$^5$ ................................. B23K 9/00
[52] U.S. Cl. ........................ 219/121.54; 219/121.39; 219/121.44; 219/121.48
[58] Field of Search ............... 219/121.44, 121.39, 219/121.59, 121.48, 75, 121.54

[56] References Cited

U.S. PATENT DOCUMENTS

| 4,000,010 | 12/1976 | Sekimoto et al. ............... 219/73 A |
| 4,338,507 | 7/1982 | Scott ............................... 219/121.44 |
| 4,426,566 | 1/1984 | Coughlin et al. ................. 219/136 |
| 4,568,814 | 2/1986 | Hamasaki et al. ............... 219/121.83 |

FOREIGN PATENT DOCUMENTS 0129603 1/1985 European Pat. Off. .

Primary Examiner—Mark H. Paschall
Attorney, Agent, or Firm—Richards, Medlock & Andrews

[57] ABSTRACT

The present invention is used as a method and an apparatus for effecting piercing start on a member to be To enable a suitable piercing start and good cutting qualities, a slag-deposition preventive (14) is applied to a portion to be pierced of a member (30) to be cut and the vicinity of the same, and a piercing start is thereafter effected, thereby preventing the slag from being deposited on the portion to be pierced and in the vicinity of the same. The apparatus has a reciprocatingly movable carriage (11) on which a plasma torch (12) of a plasma cutter mounted. An applicator (10) for applying the slag-deposition preventive is mounted on the carriage, the applicator being capable of moving together with the plasma torch (12). The apparatus is arranged to easily apply the preventive (30) to a selected portion of the member (30) to be cut.

20 Claims, 4 Drawing Sheets (1a)

| SLAG DEPOSITION PREVENTIVE | DEPOSITION RANGE $\ell$(mm) | DEPOSITION HEIGHT h(mm) |
|---|---|---|
| NOT USED | 26.3 | 2.4 |
| USED | 7.4 | 1.4 |

(1b)

(1c)

(5a)

(5b)

PREVENTING SLAG DEPOSITS ON SURFACE TO BE PIERED BY PLASMA CUTTER

TECHNICAL FIELD

This invention relates to a method and an apparatus for plasma cutting which are suitable for effecting a piercing start on a member to be cut.

BACKGROUND ART

Generally, there are two methods for cutting a steel plate into various shapes: one in which cutting is started from an end of the steel plate, and one in which cutting is started from a desirable position in the steel plate surface. The latter is a piercing start method in which a through hole is formed in the steel plate at a predetermined position, and in which cutting is started from this through hole (which operation will hereinafter be referred to as "piercing start"). This piercing start, in contrast with the former, enables any desired shape in the steel plate surface as well as a round or triangular shape to be cut. Plasma cutting methods are also based on the above two methods. In such cutting method, with respect to piercing start in particular, a plasma cutting apparatus such as the one described below is employed and there are serious problems relating to it. That is, as shown in FIG. 6a, before a hole 311 is formed through a member 30 to be cut (which operation is hereinafter referred to as "piercing"), the cut material melted by a plasma torch 12 is blown to a portion in the vicinity of the hole 311, attaches thereto, and is further accumulated as slag 32. As shown in FIG. 6b, the slag 32 interferes with the extreme end of the plasma torch 12 and acts as a cause of damage thereto when the plasma torch 12 is moved. Further, in the state shown in FIG. 6a, the melt which is blown up attaches to the extreme end of the plasma torch 12 so that the plasma jetting is obstructed, and therefore the melt may cause a reduction in cutting quality as well as damage to the plasma torch. The problem of such a drawback is very serious with respect to cutting of a thick plate by plasma cutting, because the amount of molten material is increased if the thickness of the member to be cut is increased. Conventionally, some methods are used to cope with this problem, as described below. At the time of piercing, the height of the plasma torch is increased and piercing is performed in this state, and the height of the plasma torch is thereafter reduced and cutting is performed, or cutting is started from a high position, thereby avoiding occurrence of the troublesome condition. Such methods, however, are not suitable as a means for solving the problem if improvements in quality with respect to piercing accuracy and cutting accuracy are required.

A slag-deposition preventive is known. Conventionally, a slag-deposition preventive is used in such a manner that it is applied to portions of a member to be cut including a cut end of the reverse surface and the vicinity of the same during cutting. It is used for the purpose of improving the cutting quality (e.g., appearance) of the reverse surface of the cut member by preventing deposition of slag on the portion to which the preventive is applied. That is, no idea is known which connects with a method of applying a slag-deposition preventive to the portion to be pierced to obtain desirable effects.

In view of the above-described problems of the prior art, an object of the present invention is to provide a plasma cutting method which enables a suitable piercing start and to provide a plasma cutting apparatus suitable for practicing this method.

DISCLOSURE OF THE INVENTION

A plasma cutting method for effecting a piercing start using a plasma cutter in accordance with the present invention comprises applying a slag-deposition preventive to a portion to be pierced of a member to be cut and the vicinity of the portion to be pierced, and thereafter effecting a piercing start, and thereby enables prevention of slag deposition on the portion to be pierced and the vicinity of the same. A plasma cutting apparatus suitable for practicing this method comprises an applicator for applying a slag-deposition preventive mounted on the carriage, the applicator being capable of moving together with the plasma torch, whereby the preventive is applied to a selected portion of the member to be cut.

The process of the plasma cutting method is as described below. Since the slag-deposition preventive is previously applied to the portion to be pierced in the surface of the member to be cut and the vicinity of the portion to be pierced, it is difficult for the molten material blown up at the time of piercing to attach to the pierced portion and the vicinity of the same. With respect to the whole surface of the member to be cut as well, the molten material blown up from the piercing position is blown far off by the plasma gas supplied from the plasma torch and is cooled while being blown so as to fall down to other positions (that is, not easily deposited).

Since the applicator for applying the slag-deposition preventive is mounted on the reciprocatingly movable carriage moving together with the plasma torch of the plasma cutter, it is easy to apply the slag-deposition preventive to any selected portion of the member to be cut as well as the portion to be pierced and the vicinity of the same.

BRIEF DESCRIPTION OF THE DRAWINGS

FIGS. 1a, 1b, and 1c are diagrams of the comparison between the effects of an embodiment of the plasma cutting method in accordance with the present invention and the prior art in which:

FIG. 1a is a diagram of the compared effects;

FIG. 1b is a diagram of a comparison measure, i.e., a slag deposition height; and FIG. 1c is a diagram of another comparison measure, i.e., a slag deposition range.

FIGS. 6a and 6b are diagrams showing the problems of the conventional plasma cutting method, in which:

FIG. 6a is a diagram of piecing; and

FIG. 6b is a diagram of a movement of the plasma torch.

BEST MODE FOR CARRYING OUT THE INVENTION

Figure 1:
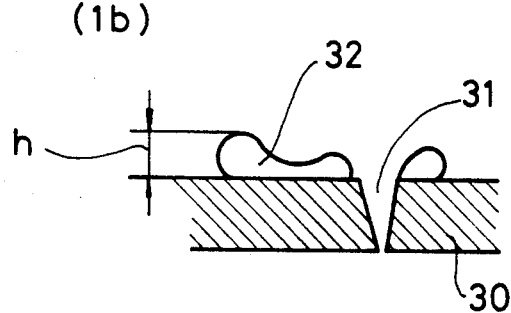
Figure 1:
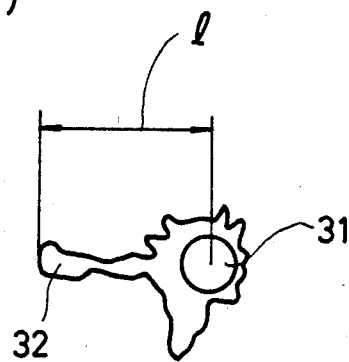

An embodiment of the plasma cutting method in accordance with the present invention will be described below with reference to FIG. 1. In this embodiment, a mixture of fine particle graphite and a solvent trichloroethane (commercial name: Unicon Laser Nondross) was used as a slag-deposition preventive.

The performance of this embodiment will be described below. The conditions for carrying out this embodiment were as follows. The plasma torch operating current was 80 A, the plasma torch height was 8 mm, oxygen gas was used as plasma gas, and a soft steel plate having a thickness of 12 mm was used as a member to be cut. Under these conditions, plasma cutting was performed 10 times by each of the conventional piercing method using no slag-deposition preventive and the method of previously applying a slag-deposition preventive to the portion to be pierced and the vicinity of the same in accordance with the present invention. FIG. 1a shows the results of a comparison therebetween. This comparison was made with respect to two measures: the deposition height h (mm), i.e., the maximum height of the mass of slag 32 deposited on the portion to be pierced of member 30 to be cut and the vicinity of the same, which was defined as shown in FIG. 1b; and the distance l (mm) between the piercing center to the farthest end of slag 32 continuously extending from the piercing center (hereinafter referred to as "deposition range"), which was defined as shown in FIG. 1c. FIG. 1a is a table showing the result of the comparison between average values of piercing performed 10 times by the two methods with respect to these comparison measures. As shown in this table, the method of the present invention limited the deposition height h to about 58% of the deposition height in the case of the conventional method, and the deposition range l to about 28% of the corresponding value of the conventional method, thus attaining remarkable effects. For another possible embodiment of the present invention, a slag-deposition preventive containing a material other than graphite as a main constituent may be used. In such a case as well, the same remarkable effects as the above embodiment can be exhibited as long as the preventive has a slag-deposition preventing effect.

In sum, it is possible to remarkably reduce the amount of slag deposited on the piercing portion by blowing-up of the molten material during piercing, which slag relates the serious problem of the prior art. The present invention therefore ensures the following effects.

(1) Collision of the plasma torch tip and the slag during the movement of the plasma torch can be avoided and the extent of damage to the plasma torch can therefore be remarkably reduced.

(2) The molten material can easily be blown far off by a plasma gas. It is thereby possible to remarkably reduce the extent of damage to the plasma torch and to improve piercing start and cutting qualities.

(3) By the effects (1) and (2), it is possible to start cutting while setting the plasma torch at a smaller height, and to thereby maintain good cutting qualities.

(4) Since the molten material is blown far off the piercing by the plasma gas, it is possible to maintain the plasma torch at an optimum height. It is therefore possible to effect a suitable piercing start even when the thickness of the plate is large.

Next, the overall construction of an ordinary plasma cutting apparatus will be described below with reference to FIGS. 5a and 5b for description of embodiments of the plasma cutting apparatus, and thereafter the first embodiment (FIG. 2), the second embodiment (FIG. 3) and the third embodiment (FIG. 4) will be described.

The plasma cutting apparatus on which a plasma cutter is mounted is, for example, an X-Y table or robot. Each of the first to third embodiments described below is an example of the plasma cutting apparatus in which a plasma cutter in accordance with the first, second or third embodiment is mounted on an X-Y table. FIGS. 5a and 5b schematically show the X-Y table. FIG. 5a is a front view, and FIG. 5b is a side view (in the direction of A—A of FIG. 5a). Referring to FIG. 5b, an Y shaft 22 is driven by a ball screw 24 and can be moved as desired in the direction Y along a rail 25. A reciprocatingly movable carriage 11 on which a plasma torch is mounted is driven by a ball screw 21 on the Y shaft 22 and can be moved as desired in the direction X along a rail 23.

Figure 2:
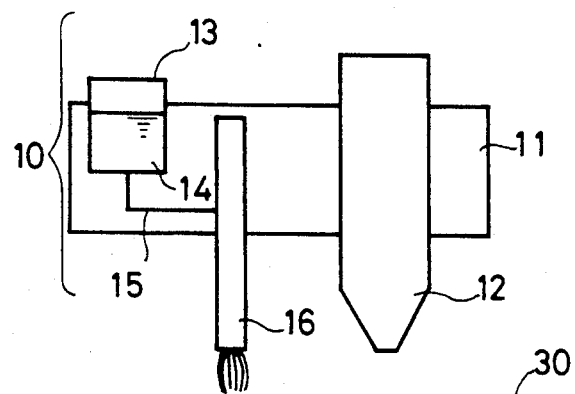
FIG. 2 is a schematic diagram of the construction of a first embodiment of a plasma cutting apparatus in accordance with the present invention.

In the first embodiment, as shown in FIG. 2, a plasma torch 12 and a slag-deposition preventive applicator 10 are mounted on a reciprocatingly movable carriage 11. The slag-deposition preventive applicator 10 is also moved with the movement of the reciprocatingly movable carriage 11. More specifically, the slag-deposition preventive applicator 10 is comprised of a tank 13 containing a slag-deposition preventive 14, a brush 16, and a pipe 15 which connects the tank 13 and the brush 15 and the which the slag-deposition preventive 14 is supplied to the brush 15. The operation of this embodiment is as described below. First, the reciprocatingly movable carriage 11 is moved to a piercing position on a member 30 to be cut. Then, the slag-deposition preventive 14 supplied from the tank 13 through the pipe 15 reaches the brush 16, and the slag-deposition preventive 14 is applied to the portion to be pierced and the vicinity of the same by finely moving the plasma torch mount shaft. The position at which the slag-deposition preventive 14 is applied is not limited to the piercing position alone; it can be applied at any position selected. Thereafter, the plasma torch 12 is returned to the per icing position to perform piercing, followed by cutting.

Figure 3:
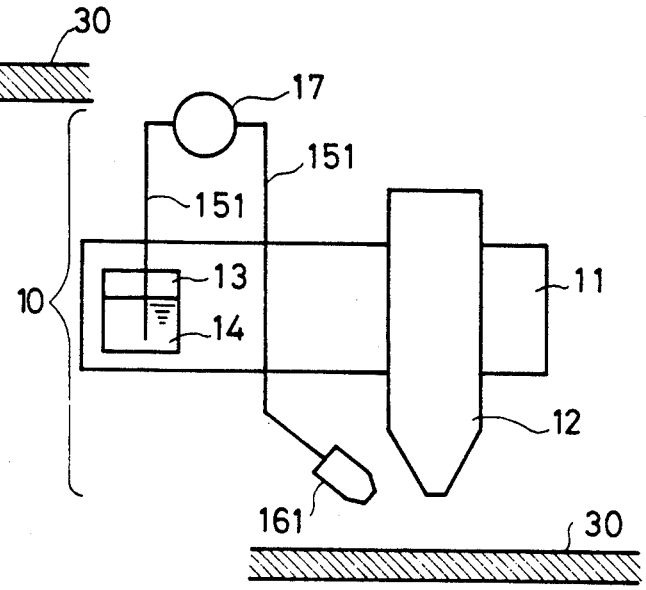
FIG. 3 is a schematic diagram of the construction of a second embodiment of the plasma cutting apparatus in accordance with the present invention.

In the second embodiment, as shown in FIG. 3, the slag-deposition preventive applicator 10 is designed as a spray type. This the slag-deposition preventive applicator 10 is comprised of a tank 13 containing a the slag-deposition preventive 14, a spraying nozzle 161, and a pipe 151 which connects the tank 13 and the nozzle 161 with a pump interposed therebetween, and through which the slag-deposition preventive 14 is supplied from the tank 13 to the nozzle 161. The operation of this embodiment is as described below. First, the reciprocatingly movable carriage 11 is moved so that the direction of spraying of the nozzle 161 coincides with a piercing position on the member 30 to be cut. Then, the pump 17 is operated to supply the slag-deposition preventive 14 form the tank 13 to the nozzle 161 through the pipe 15, and the slag-deposition preventive 14 is applied to the portion to be pierced and the vicinity of the same by spraying. Thereafter, the plasma torch 12 is returned to the piercing position to perform piercing, followed by cutting. If the arrangement is such that the nozzle 161 is inclined relative to the plasma torch 12 as illustrated, the accuracy with which the slag-deposition preventive 14 is applied right below the plasma torch 12 or in the vicinity of the right-below position can be improved, and it is possible to remove the above-described step of returning the plasma torch 12 to the piercing position after the application of the slag-deposition preventive 14, and to effect piercing while applying the preventive. Further, a plurality of nozzles 161 may be disposed around the plasma torch 12 to enable wider application.

As described above, the slag-deposition preventive applicators 10 used in the first and second embodiments are of brush and spray types, respectively. Other types of applicator including a well-known roller type and a stamp type may be used in place of them.

Figure 4:
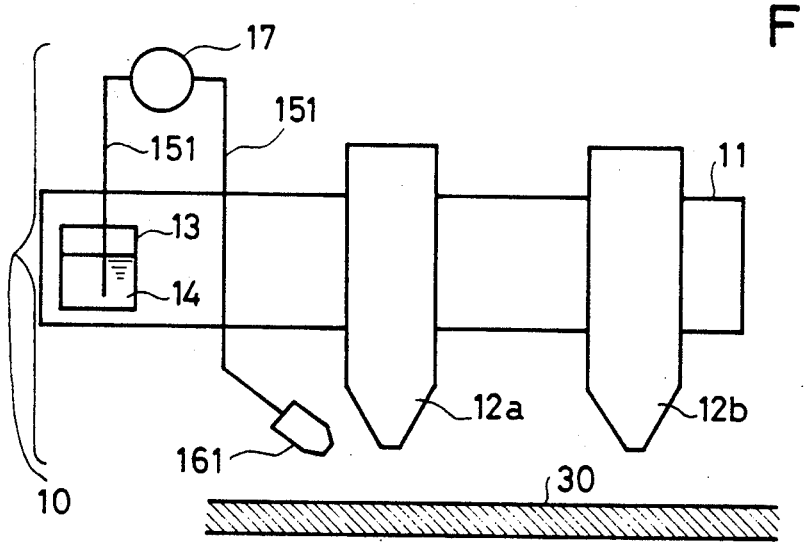
FIG. 4 is a schematic diagram of the construction of a third embodiment of the plasma cutting apparatus in accordance with the present invention.
Figure 5:
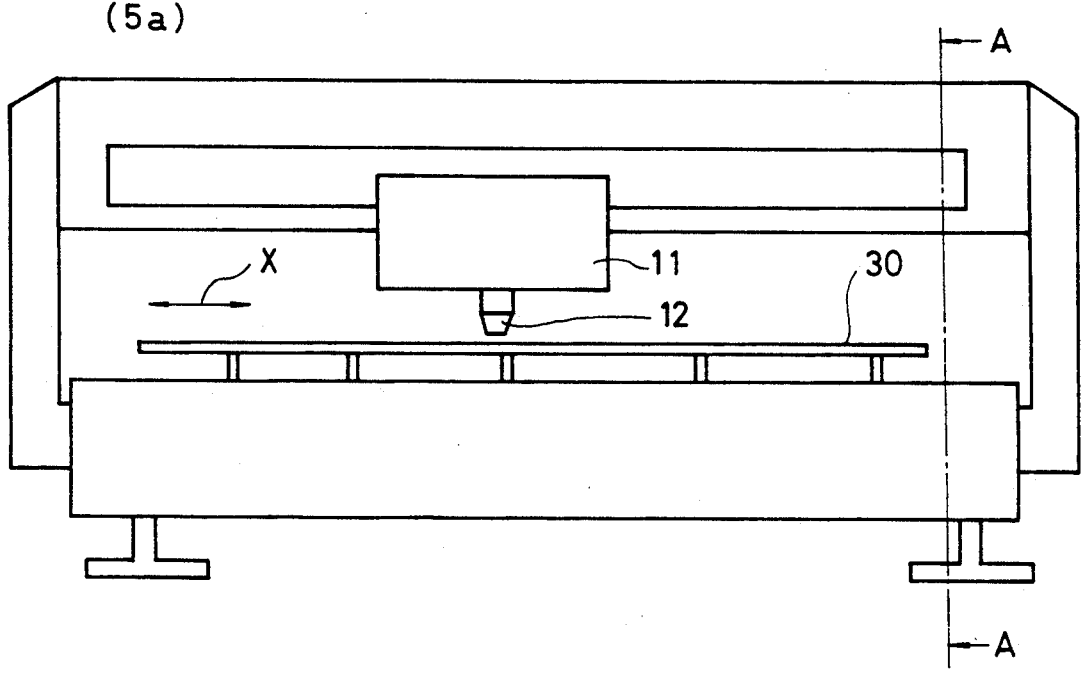
FIGS. 5a and 5b are schematic diagrams of the construction of an X-Y table on which the plasma cutter in accordance with the present invention is mounted.
Figure 5:
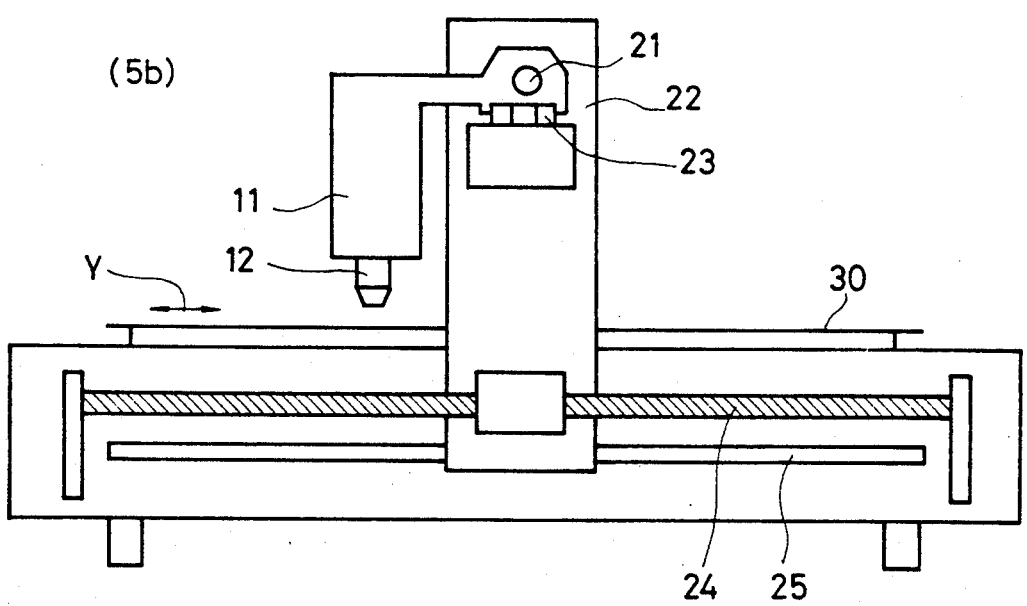
Figure 6:
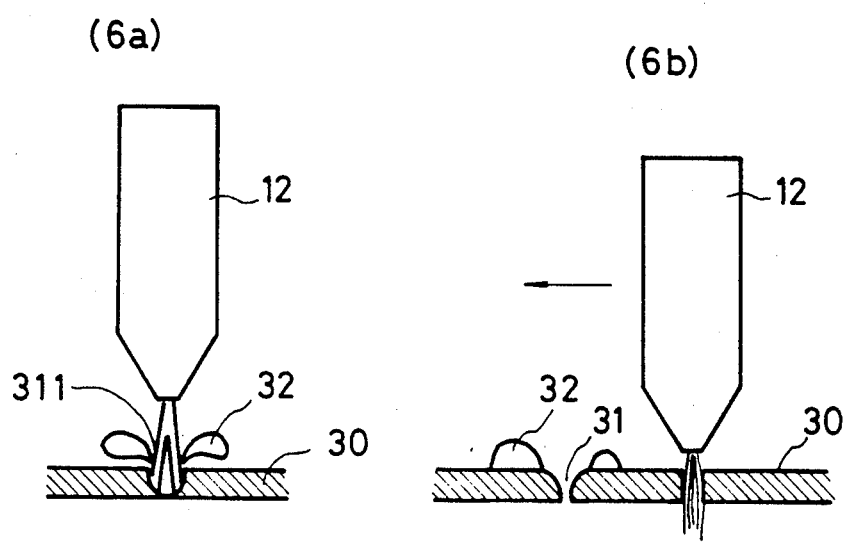

In the third embodiment, as shown in FIG. 4, the same spray-type slag-deposition preventive applicator 10 as that of the second embodiment is mounted on a reciprocatingly movable carriage 11 having a piercing plasma torch 12 and a cutting plasma torch 12b. The operation of this embodiment is as described below. First, the piercing plasma torch 12a is moved to a piercing position on the member 30 to be cut, and the slag-deposition preventive 14 is applied in a spray coating manner by the spray-type slag-deposition preventive applicator. Then, the piercing plasma torch 12a is moved to the piercing position to perform piercing. Thereafter, the cutting plasma torch 12b is moved to the piercing position to start cutting. By this arrangement, it is possible to prevent attachment of the molten material to the cutting plasma torch 12b caused by blowing-up at the time of piercing since this torch is not used for piecing, as well as to reduce the amount of molten material attached to the upper surface of the cut member 30. Consequently, it is possible to maintain the cutting accuracy with improved stability.

The effects of these embodiments will be described below in comparison with the conventional plasma cutter. Ordinarily, a working machine having a plasma cutter is operated by an operator at a distance from the member to be cut. For this reason, if the plasma cutting method of the present invention is applied to the conventional plasma cutter, it is necessary to previously apply a slag-deposition preventive to a portion to be pierced by a manual operation each time piercing is performed. Accordingly, if cutting is started in the piercing start manner from a plurality of points of the member to be cut, the burden on the operator is increased, resulting in a deterioration of the productivity. Such a problem may be solved by covering the whole of the member to be cut. However, to do so requires preparation of an extra amount of slag-deposition preventive and the operation of removing the unnecessary slag-deposition preventive from the cut member after cutting, which reduces the productivity. In contrast, in the embodiments of the present invention, the operator can apply the anti-deposition preventive easily and automatically at a desirable position (piercing position and other particular positions) by a remote control operation.

INDUSTRIAL APPLICABILITY

The present invention is used as a method and apparatus for plasma cutting to effect a piecing start on a member to be cut, and is particularly effective when used a method and apparatus for plasma cutting to prevent deposition of slag on a portion to be pierced and the vicinity of the same.

What is claimed is:

1. A plasma cutting method for effecting a piercing start in a member to be cut using a plasma torch, said member having a surface, said surface including a surface portion in which a piercing of said member is to be initiated, said method comprising the steps of:
   applying a slag-deposition preventive to said surface portion and to said surface in the vicinity of said surface portion; and
   thereafter utilizing said plasma torch to initiate a piercing in said surface portion.

2. A plasma cutting method according to claim 1, wherein the slag-deposition preventive is sprayed onto said surface portion and onto said surface in the vicinity of said surface portion from a position on the periphery of said plasma torch while said surface portion is positioned right below said plasma torch.

3. A method in accordance with claim 1 wherein said slag-deposition preventive is sprayed onto said surface portion by a nozzle directed toward said surface of said member when said member is in position to be cut.

4. A method in accordance with claim 1 wherein, during the application of said slag-deposition preventive to said surface portion in which the piercing is to be initiated, said plasma torch is positioned so that the center of the plasma torch coincides with said surface portion in which the piercing is to be initiated.

5. A method in accordance with claim 1 wherein after the completion of the application of said slag-deposition preventive to said surface portion in which the piercing is to be initiated, said plasma torch is moved so that the center of said plasma torch coincides with said surface portion in which the piercing is to be initiated.

6. A method in accordance with claim 1 wherein upon the completion of the piercing of said member by said plasma torch, said plasma torch is repositioned away from the piercing position, sand a second plasma torch is then moved to said piercing position and is utilized to cut said member, thereby avoiding attachment of molten material to said second plasma torch at the time of piercing said member at said piercing position.

7. A plasma cutting apparatus for effecting a piercing start in a member to be cut using a plasma torch, said member having a surface, said surface including a surface portion in which a piercing of said member is to be initiated, said apparatus comprising a reciprocatingly movable carriage, a plasma torch of a plasma cutter mounted on said carriage, and an applicator for applying a slag-deposition preventive to said surface portion in which a piercing of said member is to be initiated, said applicator including a container of said slag-deposition preventive, said applicator being mounted on said carriage, said carriage being capable of moving said applicator together with the plasma torch in an X direction and in a Y direction in an X-Y plane on the same side of a member to be cut by said plasma torch.

8. A plasma cutting apparatus according to claim 7, wherein said applicator has a nozzle for spraying the slag-deposition preventive onto said surface portion.

9. A plasma cutting apparatus according to claim 7, wherein said applicator has a plurality of nozzles for spraying the slag-deposition preventive onto said surface portion and onto said surface in the vicinity of said surface portion.

10. A plasma cutting apparatus according to claim 7, wherein said applicator further comprises a nozzle for spraying the slag-deposition preventive onto said surface portion, and a pump for supplying said slag-deposition preventive from said container to said nozzle.

11. A plasma cutting apparatus according to claim 10, wherein said nozzle is inclined relative to the plasma torch so that the slag-deposition preventive is applied onto said surface portion, said surface portion being right below the plasma torch.

12. A plasma cutting apparatus according to claim 7, wherein said applicator further comprises a brush for applying the slag-deposition preventive onto said surface portion, and a pipe for supplying said slag-deposition preventive from said container to said brush.

13. A method of cutting a member with a plasma torch utilizing a piercing start, said member having a surface, said surface including a surface portion in which a piercing of said member is to be initiated, said method comprising the steps of:
   moving a reciprocating base, on which a plasma torch and an applicator of slag-deposition preventive are mounted, over said surface of said member so that the pattern of any said slag-deposition preventive emitted from said applicator onto said surface of said member at least coincides with the piercing start position on said surface of said member;
   causing said applicator to apply said slag-deposition preventive onto said surface of said member at least at said piercing start position to provide a coating of said slag-deposition preventive on said surface of said member at least at said piercing start position on said surface of said member;
   positioning said plasma torch so that it coincides with the piercing start position on said surface of said member; and
   utilizing the thus positioned plasma torch to initiate a piercing of said member at said piercing start position on said surface of said member to cut a hole through said member at the thus coated piercing start position on said surface of said member.

14. A method in accordance with claim 13, wherein said applicator comprises a nozzle directed toward said surface of said member when said member is in position to be cut, a source of slag-deposition preventive, and a pipe for supplying said slag-deposition preventive from said source to said nozzle.

15. A method in accordance with claim 14, wherein said plasma torch is positioned so that the center of the plasma torch coincides with the piercing start position on said surface of said member during the application of said coating of said slag-deposition preventive at said piercing start position on said surface of said member.

16. A method in accordance with claim 13, wherein after the completion of the application of said coating of said slag-deposition preventive at said piercing start position on said surface of said member, said reciprocating base is repositioned so that the center of said plasma torch coincides with the piercing start position on said surface of said member.

17. A method in accordance with claim 15 wherein after the completion of the application of said coating of said slag-deposition preventive at said piercing start position on said surface of said member, said reciprocating base is repositioned so that the center of said plasma torch coincides with the piercing start position on said surface of said member.

18. A method in accordance with claim 17 wherein upon the completion of the piercing of said member at said piercing start position to cut a hole through said member, said plasma torch is repositioned away from said piercing start position, and a second plasma torch is then moved to said piercing start position and is utilized to cut said member, thereby avoiding attachment of molten material to said second plasma torch at the time of piercing said member at said piercing start position.

19. A method in accordance with claim 13 wherein said plasma torch is positioned so that the center of the plasma torch coincides with the piercing start position on said surface of said member during the application of said coating of said slag-deposition preventive at said piercing start position on said surface of said member.

20. A method in accordance with claim 13 wherein upon the completion of the piercing of said member at said piercing start position to cut a hole through said member, said plasma torch is repositioned away from said piercing start position, and a second plasma torch is the moved to said piercing start position and is utilized to cut said member, thereby avoiding attachment of molten material to said second plasma torch at the time of piercing said member at said piercing start position.

* * * * *